(12) United States Patent
Ahmadnian et al.

(10) Patent No.: US 8,211,987 B2
(45) Date of Patent: Jul. 3, 2012

(54) DEODORIZATION OF POLYMER COMPOSITIONS

(75) Inventors: Fatemeh Ahmadnian, Berlin (DE);
Wolfgang Loth, Bad Duerkheim (DE);
Karl-Heinz Wassmer, Mutterstadt (DE);
Andreas Brodhagen, Tiefenthal (DE);
Gerd Konrad, Speyer (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/084,805

(22) Filed: Apr. 12, 2011

(65) Prior Publication Data

US 2011/0251345 A1 Oct. 13, 2011

Related U.S. Application Data

(60) Provisional application No. 61/323,372, filed on Apr. 13, 2010.

(51) Int. Cl.
*C08F 283/00* (2006.01)
*C08F 297/04* (2006.01)
(52) U.S. Cl. ............... 525/501; 525/54; 525/187
(58) Field of Classification Search .......... 525/54, 525/187
See application file for complete search history.

(56) References Cited

U.S. PATENT DOCUMENTS

| 3,210,328 A | 10/1965 | Kiefer, Jr. |
| 4,529,753 A | 7/1985 | Taylor |
| 5,283,021 A | 2/1994 | Shih |
| 6,096,858 A | 8/2000 | Dobbelaar et al. |
| 2010/0227995 A1 | 9/2010 | Kohler |
| 2011/0028666 A1 | 2/2011 | Mattmann et al. |
| 2011/0054071 A1 | 3/2011 | Mattmann et al. |
| 2011/0092645 A1 | 4/2011 | Loth et al. |

FOREIGN PATENT DOCUMENTS

| DE | 1 248 943 | 8/1967 |
| DE | 196 21 027 A1 | 11/1997 |
| DE | 197 16 373 A1 | 10/1998 |
| EP | 0 650 977 A1 | 5/1995 |
| EP | 0 967 232 A1 | 12/1999 |
| WO | WO 2009/037142 A1 | 3/2009 |
| WO | WO 2010/031823 A1 | 3/2010 |

OTHER PUBLICATIONS

International Search Report issued Jul. 8, 2011 in PCT/EP2011/055690.
U.S. Appl. No. 13/042,780, filed Mar. 8, 2011, Ahmadnian, et al.

*Primary Examiner* — Terressa Boykin
(74) *Attorney, Agent, or Firm* — Oblon, Spivak, McClelland, Maier & Neustadt, L.L.P.

(57) ABSTRACT

The present invention relates to a method for reducing residual volatiles from polymer compositions.

22 Claims, 2 Drawing Sheets

DEODORIZATION OF POLYMER COMPOSITIONS

BACKGROUND OF THE INVENTION

The present invention relates to a method for reducing residual volatiles from polymer compositions.

Polymer compositions normally contain unwanted volatile organic constituents, such as residual monomers from incomplete conversion, impurities in the starting materials, initiator decomposition products, products of low molecular weight from secondary reactions, etc. These components are generally referred to as residual volatiles or VOCs (volatile organic components).

Basically, there are two methods of removing residual volatiles: chemical and physical deodorization. In chemical deodorization, a post-polymerization converts extant polymerizable components (primarily the monomers employed) into oligomers and polymers which are no longer volatile. Thus, e.g. in the preparation of polymer solutions or polymer dispersions from ethylenically unsaturated monomers, post-polymerization usually involves an initiator different from that, similar to that or the same as that used in the main polymerization.

Chemical deodorization has the drawback that only the polymerizable residual volatiles can be eliminated. All saturated secondary components from impurities of the starting materials and secondary reactions of the additional ingredients remain as residual volatiles in the product. At the same time, chemical deodorization itself may also lead to the formation of secondary components. As an example, acetone and t-butanol may be formed when t-butyl hydroperoxide/acetone bisulfite are used as redox-initiator system in the polymerization, and formaldehyde and t-butanol may be formed when t-butyl hydroperoxide/sodium hydroxymethanesulfinate are used as initiators. The deodorization of polymers on the basis of esters of vinyl alcohol with $C_1$-$C_{30}$-mono-carboxylic acids may lead to ester cleavage and secondary products. Thus, the deodorization of polymers on the basis of vinyl acetate may lead to the formation of acetic acid or acetaldehyde. Both the impurities and the newly introduced substances remain in the polymer product as residual volatiles.

In the case of physical deodorization, the liquid polymer composition is stripped with a stripping agent, e.g. steam, in a stirred vessel. A problem occurring in continuous stripping of liquid polymer compositions and especially of polymer dispersions containing or acting as emulsifiers is the formation of foam.

DE 12 48 943 teaches a process for the production of odour-lean aqueous polymer dispersions by leading steam or hot inert gas through the boiling dispersion and repeated short decreases in pressure by 100 to 350 Torr to remove the foam.

DE 196 21 027 A1 and DE 197 16 373 A1 describe a physical deodorization process for the continuous removal of monomers from aqueous suspensions or dispersions using steam in a counter-current flow column fitted with sieves.

Physical and chemical deodorization may also be employed simultaneously, as is described in U.S. Pat. No. 4,529,753. This document describes a process wherein a polymer dispersion is subjected to temperature and pressure conditions at which the vapour pressure of water in the ambient atmosphere is lower than the vapour pressure of water in the dispersion. The emulsion is not significantly degraded or destabilized and into the emulsion a free radical generator is introduced until the residual monomer content is not more than 0.05 percent by weight.

EP 0 967 232 A1 relates to a process for removing residual volatiles from polymer dispersions by performing first chemical deodorization to remove residual monomers and then physical deodorization to remove volatile components.

EP 0 650 977 A1 describes a method of removing residual monomers from polymer dispersions which involves sequential application of chemical and physical deodorization. In comparison to the process of U.S. Pat. No. 4,529,753, the method of EP 0 650 977 A1 is assumed to result in lower residual monomer concentrations within an acceptable time frame. To achieve this, the dispersion is first treated with a sufficient amount of an initiator system until the residual monomer content is reduced to 1500 to 6000 ppm. Then follows a physical deodorization with steam under subatmospheric pressure, in the course of which the residual monomer content is reduced to about 5 to 500 ppm.

In a first preferred embodiment of EP 0 650 977 A1, precisely controlled vacuum is applied to the tank vessel. The vacuum is set at a selected value of absolute pressure which will determine the boiling point of the water in the system and hence the desired temperature at which the stripping operation is to be carried out. Typically, the procedure is carried out at the absolute pressure corresponding to the boiling point of water at the particular temperature. When the desired pressure is achieved, controlled injection of live steam is started at the bottom of the vessel to allow contact of the steam with the emulsion as the steam passes through the liquid upwards. The agitator runs throughout the process. At the beginning of the steam injection process, the temperature of the latex is lower than the boiling point. Hence, during this phase, the steam condenses in the latex releasing its latent heat and serves to elevate the batch temperature. When the batch temperature reaches the boiling point of water at the set pressure, no further rise in temperature is evidenced, and the actual stripping is taking place. The vapors drawn off from the process are directed by a pipework at the top of the vessel to the tube side of a shell-and-tube type condenser or can be removed by other means, for example, by means of a jet eductor. The vapors condense and the resulting liquid drains to a receiver vessel for later disposal. Steam injection continues until the desired level of residual monomer is achieved. Then the steam injection is stopped and the pressure is lowered to full vacuum.

In a second (not preferred) embodiment of EP 0 650 977 A1, the polymer composition is transferred to the stripping vessel and vacuum is applied to the vessel in an uncontrolled fashion. In this embodiment, steam is injected not at a constant rate, but at a rate so as to maintain a constant temperature in the stripping vessel. It is a disadvantage of this embodiment that during the initial application of vacuum a great deal of foam is generated and, depending on type of product, may fill the vessel and the overheads (pipework and condenser) with foam.

There is still a need for an effective method for reducing residual volatiles from polymer compositions that are essentially free from water. This regards in particular polymer compositions that are surface active and tend to a formation of foam. A special problem is the removal of unwanted volatile organic constituents from polymer compositions that are water-sensitive, e.g. because they might undergo a hydrolysis.

BRIEF SUMMARY OF THE INVENTION

It is an object of the present invention to provide an effective process for deodorizing essentially water-free polymer compositions and in particular polymer compositions that can act as emulsifiers for example on contact with water.

We have found that this object is achieved by a method for the reduction of at least one volatile organic component in a polymer composition, wherein i) a liquid polymer composition which is essentially free from water and comprises a polymer and at least one volatile organic component is provided,
ii) the polymer composition is brought into contact with a stripping agent, and
iii) the polymer composition is subjected to a treatment under vacuum, wherein the pressure is reduced in the course of step iii).

A preferred embodiment relates to the novel method, wherein i) a liquid polymer composition which has a water content of not more than 1% by weight based on the total weight of the polymer composition and which comprises a polymer and at least one volatile organic component is provided,
ii) the polymer composition is brought into contact with a stripping agent, and
iii) the polymer composition is subjected to a treatment under vacuum, wherein the pressure is reduced in the course of step iii), the stripping agent employed in step ii) being selected from liquid water, steam, inert gases and combinations thereof.

Preferably, the polymer composition comprises at least one surface active polymer, in particular at least one amphiphilic polymer.

In the sense of the present application the term "surface active polymer" comprises very generally nonionic, anionic, cationic, amphoteric (zwitterionic) and neutral polymers. The term "amphiphilic polymer" denotes a polymer that contains both hydrophobic groups and hydrophilic groups. "Surface active polymers" are suitable to reduce the interfacial tension of a liquid-liquid phase interface or the surface tension of a gas-liquid phase interface. In particular, the surface active polymer employed in the process of the invention foams on contact with water.

The process of the invention has at least one of the following advantages:

The process is very effective and allows the preparation of polymer compositions having a low content of volatile organic components within a short time of treatment.

The process allows effective control of the formation of foam.

Surprisingly, the process of the invention allows the treatment of certain polymer compositions that are deemed sensitive to water, e.g. polymer compositions on the basis of esters of vinyl alcohol with $C_1$-$C_{30}$-monocarboxylic acids. The process of the invention allows in particular the treatment of graft copolymers on the basis of vinyl acetate.

The process of the invention also allows an effective separation of volatile organic components from polyetherols which were synthesized by means of basic catalysis or DMC catalysis. This is surprising because the treatment of polyetherols which still contain catalyst residues appears problematic in principle, as chain degradation might occur.

The treatment according to the invention leads to a particularly economical process since the stripping gas containing unreacted monomers can be recycled.

DETAILED DESCRIPTION OF THE INVENTION

Figure 1:
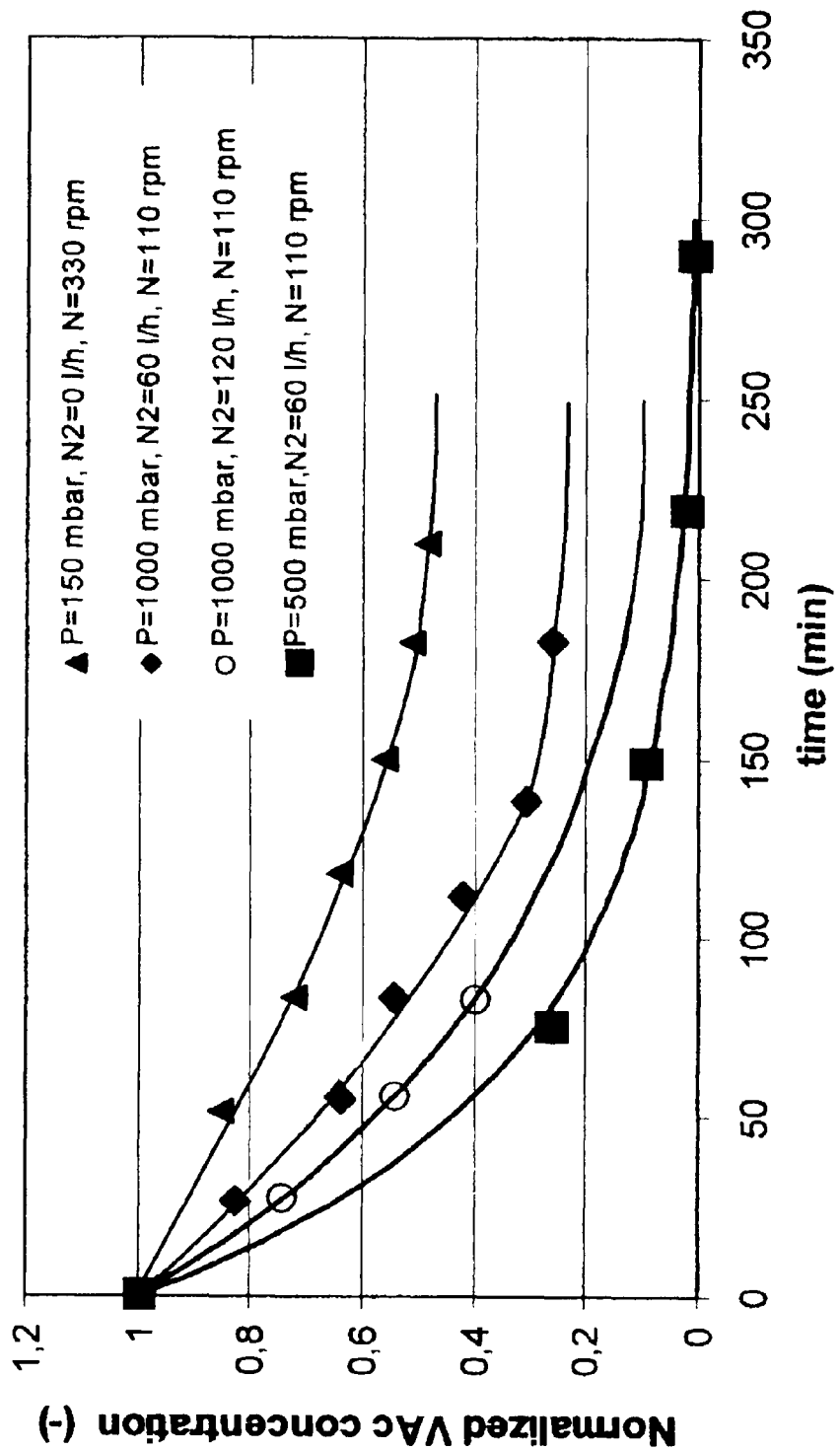
FIG. 1 shows the decrease in the normalized vinyl acetate concentration over time.

In the context of the present application a polymer composition that is "essentially free from water" has a water content of not more than 1% by weight, preferably of not more than 0.5% by weight, more preferably not more than 0.1% by weight, based on the total weight of the polymer composition.
Step i)

The polymer composition provided in step i) is obtainable by a polymerization reaction that can involve a polycondensation, polyaddition, free-radical polymerization, cationic polymerization, anionic polymerization, or coordinative polymerization.
Free-Radical Polymerization In a first preferred embodiment, the polymer composition provided in step i) is obtainable by a free-radical polymerization. Free-radical polymerization also encompasses graft polymerization of at least one unsaturated monomer in the presence of a graft base.
Monomers for Free-Radical Polymerization In the method according to the invention, at least one free-radically polymerizable $\alpha,\beta$-ethylenically unsaturated monomer is used for the polymerization. Suitable monomers are selected from monoethylenically unsaturated carboxylic acids, sulfonic acids and phosphonic acids, esters of $\alpha,\beta$-ethylenically unsaturated mono- and dicarboxylic acids with $C_1$-$C_{20}$-alkanols, vinylaromatics, esters of vinyl alcohol with $C_1$-$C_{30}$-monocarboxylic acids, ethylenically unsaturated nitriles, vinyl halides, vinylidene halides, esters of $\alpha,\beta$-ethylenically unsaturated mono- and dicarboxylic acids with $C_2$-$C_{30}$-alkanediols, amides of $\alpha,\beta$-ethylenically unsaturated mono- and dicarboxylic acids with $C_2$-$C_{30}$-amino alcohols which have a primary or secondary amino group, primary amides of $\alpha,\beta$-ethylenically unsaturated monocarboxylic acids and the N-alkyl and N,N-dialkyl derivatives thereof, N-vinyllactams, open-chain N-vinylamide compounds, esters of allyl alcohol with $C_1$-$C_{30}$-monocarboxylic acids, esters of $\alpha,\beta$-ethylenically unsaturated mono- and dicarboxylic acids with amino alcohols, amides of $\alpha,\beta$-ethylenically unsaturated mono- and dicarboxylic acids with diamines which have at least one primary or secondary amino group, N,N-diallylamines, N,N-diallyl-N-alkylamines, vinyl- and allyl-substituted nitrogen heterocycles, vinyl ethers, $C_2$-$C_8$-monoolefins, nonaromatic hydrocarbons having at least two conjugated double bonds, polyether (meth)acrylates, monomers having urea groups and mixtures thereof.

Suitable ethylenically unsaturated carboxylic acids, sulfonic acids and phosphonic acids or derivatives thereof are acrylic acid, methacrylic acid, ethacrylic acid, $\alpha$-chloroacrylic acid, crotonic acid, maleic acid, maleic anhydride, itaconic acid, citraconic acid, mesaconic acid, glutaconic acid, aconitic acid, fumaric acid, the monoesters of monoethylenically unsaturated dicarboxylic acids having from 4 to 10 and preferably from 4 to 6 carbon atoms, for example monomethyl maleate, vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid and allylphosphonic acid. The monomers containing acid groups can be used for the polymerization in the form of the free acid or in partly or fully neutralized form. Suitable bases for the neutralization are, for example, KOH, NaOH, ammonia, etc.

Particular preference is given to acrylic acid, methacrylic acid and salts and mixtures thereof.

Suitable esters of α,β-ethylenically unsaturated mono- and dicarboxylic acids with $C_1$-$C_{20}$-alkanols are methyl (meth)acrylate, methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachinyl (meth)acrylate, behenyl (meth)acrylate, lignoceryl (meth)acrylate, cerotinyl (meth)acrylate, melissinyl (meth)acrylate, palmitoleoyl (meth)acrylate, oleyl (meth)acrylate, linolyl (meth)acrylate, linolenyl (meth)acrylate, stearyl (meth)acrylate, lauryl (meth)acrylate and mixtures thereof.

Preferred vinylaromatics are styrene, 2-methylstyrene, 4-methylstyrene, 2-(n-butyl)styrene, 4-(n-butyl)styrene, 4-(n-decyl)styrene, and particular preference is given to styrene.

Suitable esters of vinyl alcohol with $C_1$-$C_{30}$-monocarboxylic acids are, for example, vinyl formate, vinyl acetate, vinyl propionate, vinyl butyrate, vinyl laurate, vinyl stearate, vinyl propionate, vinyl versatate and mixtures thereof.

Suitable ethylenically unsaturated nitriles are acrylonitrile, methacrylonitrile and mixtures thereof.

Suitable vinyl halides and vinylidene halides are vinyl chloride, vinylidene chloride, vinyl fluoride, vinylidene fluoride and mixtures thereof.

Suitable esters of α,β-ethylenically unsaturated mono- and dicarboxylic acids with $C_2$-$C_{30}$-alkanediols are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate etc.

Suitable primary amides of α,β-ethylenically unsaturated monocarboxylic acids and the N-alkyl and N,N-dialkyl derivatives thereof are acrylamide, methacrylamide, N-methyl(meth)acrylamide, N-ethyl(meth)acrylamide, N-propyl(meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth)acrylamide, N-arachinyl(meth)acrylamide, N-behenyl(meth)acrylamide, N-lignoceryl(meth)acrylamide, N-cerotinyl(meth)acrylamide, N-melissinyl(meth)acrylamide, N-palmitoleoyl(meth)acrylamide, N-oleyl(meth)acrylamide, N-linolyl(meth)acrylamide, N-linolenyl(meth)acrylamide, N-stearyl(meth)acrylamide, N-lauryl(meth)acrylamide, N,N-dimethyl(meth)acrylamide, N,N-diethyl(meth)acrylamide, morpholinyl(meth)acrylamide.

Suitable N-vinyllactams and derivatives thereof are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam etc.

Suitable open-chain N-vinylamide compounds are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide.

Suitable esters of α,β-ethylenically unsaturated mono- and dicarboxylic acids with amino alcohols are N,N-dimethylaminomethyl (meth)acrylate, N,N-dimethylaminoethyl (meth)acrylate, N,N-diethylaminoethyl acrylate, N,N-dimethylaminopropyl (meth)acrylate, N,N-diethylaminopropyl (meth)acrylate and N,N-dimethylaminocyclohexyl (meth)acrylate.

Suitable amides of α,β-ethylenically unsaturated mono- and dicarboxylic acids with diamines which have at least one primary or secondary amino group are N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl]acrylamide, N-[4-(dimethylamino)cyclohexyl]acrylamide, N-[4-(dimethylamino)cyclohexyl]methacrylamide etc.

Suitable monomers are also N,N-diallylamines and N,N-diallyl-N-alkylamines and the acid addition salts and quaternization products thereof. Alkyl here is preferably $C_1$-$C_{24}$-alkyl. Preference is given to N,N-diallyl-N-methylamine and N,N-diallyl-N,N-dimethylammonium compounds, for example the chlorides and bromides.

Suitable monomers M) are also vinyl- and allyl-substituted nitrogen heterocycles, such as N-vinylimidazole, N-vinyl-2-methylimidazole, vinyl- and allyl-substituted heteroaromatic compounds, such as 2- and 4-vinylpyridine, 2- and 4-allylpyridine, and the salts thereof.

Suitable $C_2$-$C_8$-monoolefins and non-aromatic hydrocarbons having at least two conjugated double bonds are, for example, ethylene, propylene, isobutylene, isoprene, butadiene, etc.

The aforementioned monomers can be used individually, in the form of mixtures within one monomer class, or in the form of mixtures of different monomer classes.

Free-Radical Polymerization

The polymer composition provided in step i), which is obtainable by a free-radical polymerization, is prepared in accordance with customary methods known to the person skilled in the art. The polymerization may, for example, be carried out as a solution polymerization, bulk polymerization, emulsion polymerization, inverse emulsion polymerization, suspension polymerization, inverse suspension polymerization or precipitation polymerization. Preference is given to bulk polymerization and primarily solution polymerization, which is carried out, in particular, in the absence of water.

If the polymerization is performed in the presence of water or of at least one organic solvent that is volatile under the conditions of step iii), the solvent is preferably removed or replaced before the polymer composition is employed in steps ii) and iii) of the process of the invention.

The polymerization can be carried out continuously, semi-continuously or batch-wise. A plurality of monomers may be added separately or as mixtures, which can be produced, for example, by preparing a premix in a stirred vessel or by combining the individual feeds in a common pipeline.

The initiator is usually added via a separate feed, but the monomer feed and initiator feed may be combined before entering the reaction vessel. Depending on the compatibility, the other components of the reaction mixture, e.g. polymerization regulators, are added together with one of the above-mentioned feeds or separately, either in pure form or in a suitable solvent.

In a suitable embodiment the polymerization can be carried out semi-continuously. According to this embodiment, at least one monomer or optionally (if present) a graft base can be initially introduced into a reactor and heated to the polymerization temperature, the monomer(s) and the free radical initiator being added either in one or more than one batches or preferably continuously to the reactor, and then be polymerized.

Bulk polymerization may involve dissolving at least one monomer that is not liquid under the polymerization conditions in a co-monomer or a graft base that is liquid under the polymerization conditions, heating the mixture to the polymerization temperature and, following the addition of a free radical initiator, polymerizing.

The polymerization can of course also be carried out in a solvent. Preferred organic solvents that are not volatile under the treatment conditions of step iii) are mentioned below. Of course, water and/or a volatile organic solvent can also be used. In this case, the solvent is preferably removed at least partly before the polymer composition is brought into contact with a stripping agent in step ii). Preferably, solvents that are not volatile under the treatment conditions of step iii) are replaced at least partly before the polymer composition is brought into contact with the stripping agent in step ii). Suitable volatile solvents are, for example, water, aliphatic and cycloaliphatic monohydric alcohols such as methanol, ethanol, n-propanol, isopropanol, n-butanol, sec-butanol, tert-butanol, n-hexanol and cyclohexanol, cyclic ethers, such as tetrahydrofurane or dioxane, aliphatic hydrocarbons and hydrocarbon mixtures such as pentane, hexane or ligroine, halogenated hydrocarbons such as dichloromethane or chloroform, esters such as acetyl acetate, ketones such as acetone or methyl ethyl ketone, etc.

Suitable free-radical initiators are primarily peroxo compounds, azo compounds, redox initiator systems and reducing compounds. Of course, mixtures of free radical initiators can also be used.

Examples of suitable free radical initiators are specifically: alkali metal peroxodisulfates, e.g. sodium peroxodisulfate, ammonium peroxodisulfate, hydrogen peroxide, organic peroxides, such as diacetyl peroxide, di-tert-butyl peroxide, diamyl peroxide, dioctanoyl peroxide, didecanoyl peroxide, dilauroyl peroxide, dibenzoyl peroxide, bis(o-toloyl) peroxide, succinyl peroxide, tert-butyl peracetate, tert-butyl permaleate, tert-butyl perisobutyrate, tert-butyl perpivalate, tert-butyl peroctoate, tert-butyl perneodecanoate, tert-butyl perbenzoate, tert-butyl peroxide, tert-butyl hydroperoxide, cumene hydroperoxide, tert-butyl peroxy-2-ethylhexanoate and diisopropyl peroxydicarbamate; azobisisobutyronitrile, azobis(2-amidopropane)dihydrochloride and 2,2'-azobis(2-methylbutyronitrile); sodium sulfite, sodium bisulfite, sodium formaldehyde sulfoxylate and hydrazine and combinations of these compounds with hydrogen peroxide; ascorbic acid/iron(II) sulfate/sodium peroxodisulfate, tert-butyl hydroperoxide/sodium disulfite and tert-butyl hydroperoxide/sodium hydroxymethanesulfinate.

Based on the weight of the monomers employed, 0.01 to 10% by weight, preferably 0.1 to 5% by weight of free radical initiators is usually used.

If desired, polymerization regulators can also be used. Compounds known to the person skilled in the art as regulators are generally suitable, e.g. sulfur compounds such as mercaptoethanol, 2-ethylhexyl thioglycolate, thioglycolic acid and dodecylmercaptan. If polymerization regulators are used, their use amount is usually 0.1 to 15% by weight, preferably 0.1 to 5% by weight and particularly preferably 0.1 to 2.5% by weight, based on the amount of monomer.

The polymerization temperature is usually 0° C. to 300° C., preferably 20° C. to 250° C. and particularly preferably 25° C. to 200° C.

The polymerization is usually carried out under atmospheric pressure, but can also proceed under reduced or increased pressure, e.g. from 0.1 bar to 50 bar, preferably from 1 bar to 10 bar.

In a specific embodiment, the process according to the invention serves to prepare polymers containing esters of vinyl alcohol with $C_1$-$C_{30}$-monocarboxylic acids, in particular vinyl acetate.

Graft Base

In a special embodiment, the polymer composition provided in step i) is obtainable by a free-radical polymerization in the presence of a graft base. Preferably, the graft base does not contain monoethylenically unsaturated units.

Preferred graft bases are polyether-containing compounds, in particular non-ionic polymers which have polyalkylene glycol groups. The proportion of polyalkylene glycol groups is preferably at least 40% by weight, more preferably at least 60% by weight, based on the total weight of the polyether-containing graft bases. Suitable polyether-containing graft bases are, for example, polyalkylene glycols, polyesters based on polyalkylene glycols, and polyether urethanes.

The graft base is preferably a polyether selected from the group of polyalkylene oxides, polytetrahydrofuran, and polyglycerol. Suitable polyalkylene oxides are based on ethylene oxide, propylene oxide, butylene oxides and mixtures thereof. Depending on the type of monomer building blocks used for their preparation, the preferably contain the following structural units:

—(CH$_2$)$_2$—O—, —(CH$_2$)$_3$—O—, —(CH$_2$)$_4$—O—, —CH$_2$—CH(CH$_3$)—O—, —CH$_2$—CH(CH$_2$—CH$_3$)—O—, —CH$_2$—CHOR$^a$—CH$_2$—O—, in which $R^a$ is $C_1$-$C_{24}$-alkyl, preferably $C_1$-$C_4$-alkyl.

Suitable graft bases are homopolymers or copolymers. The copolymers can contain the alkylene oxide units in random distribution or in the form of blocks.

The polyether-containing graft bases can additionally have bridging groups which are chosen, for example, from:

—C(=O)—O—, —O—C(=O)—O—, —C(=O)—NR$^b$—, —O—C(=O)—NR$^b$—, —NR$^c$—(C=O)—NR$^b$—, in which $R^b$ and $R^c$, independently of one another, are hydrogen, $C_1$-$C_{30}$-alkyl, preferably $C_1$-$C_4$-alkyl or cycloalkyl.

The polyether-containing graft bases preferably have a number-average molecular weight $M_n$ of at least 300. The average molecular weight $M_n$ of the polyether-containing graft bases is usually $\leq 100000$. It is preferably in a range of from 500 to 50000.

The terminal primary hydroxyl groups of the polyethers prepared on the basis of alkylene oxides, tetrahydrofuran or glycerol, and the secondary OH groups of polyglycerol may either be present in free form, or else etherified with $C_1$-$C_{24}$-alcohols, esterified with $C_1$-$C_{24}$-carboxylic acids or be reacted with isocyanates to give urethanes. Alcohols suitable for this purpose are, for example, primary aliphatic alcohols, such as methanol, ethanol, propanol and butanol, primary aromatic alcohols, such as phenol, isopropylphenol, tert-butylphenol, octylphenol, nonylphenol and naphthol, secondary aliphatic alcohols, such as isopropanol, tertiary aliphatic alcohols, such as tert-butanol and polyhydric alcohols, e.g. diols, such as ethylene glycol, diethylene glycol, propylene glycol, 1,3-propanediol and butanediol, and triols, such as glycerol and trimethylolpropane. The hydroxyl groups can, however, also be replaced by primary amino groups by reductive amination, e.g. with hydrogen/ammonia mixtures under pressure, or be converted into aminopropylene end groups by cyanoethylation with acrylonitrile and hydrogenation. In this case, the capping of the hydroxyl end groups can take place not only subsequently by reacting with the alcohols or with alkali metal hydroxide solutions, amines and hydroxylamines, but these compounds can, like Lewis acids, e.g. boron trifluoride, also be used at the start of the polymerization as initiators. Finally, the hydroxyl groups can also be capped by reacting with alkylating agents such as dimethyl sulfate.

Advantageously, homopolymers and copolymers of ethylene oxide, propylene oxide, butylene oxide and isobutylene oxide, which may be linear or branched, are used as graft base. According to the invention, the term homopolymers here may also include those polymers which, apart from the polymerized alkylene oxide unit, also contain the reactive molecules which have been used to initiate the polymerization of the cyclic ethers or for terminal capping of the polymer.

Branched polymers can be prepared by adding ethylene oxide and/or propylene oxide and/or butylene oxides onto low molecular weight polyalcohols, e.g. pentaerythritol, glycerol and sugars or sugar alcohols, such as sucrose, D-sorbitol and D-mannitol, disaccharides.

Suitable graft bases are also obtained by adding alkylene oxides onto diamines, preferably ethylenediamine.

Further suitable graft bases can be prepared by reacting alkylene oxides with amines of higher functionality, e.g. triamines, or in particular polyethylenimines.

Further suitable graft bases are polyesters that can be prepared by reaction of polyalkylene oxides and aliphatic or aromatic dicarboxylic acids, e.g. oxalic acid, succinic acid, adipic acid or terephthalic acid.

It is also possible to use polycarbonates of polyalkylene oxides prepared by phosgenation or else polyurethanes of polyalkylene oxides and aliphatic $C_1$-$C_{12}$, preferably $C_1$-$C_6$- diisocyanates or aromatic diisocyanates, e.g. hexamethylene diisocyanate or phenylene diisocyanate, as graft base.

In a specific embodiment, in step i) of the process according to the invention, a graft polymer containing in polymerized form at least one ester of a vinyl alcohol with a $C_1$-$C_{30}$- monocarboxylic acid is provided. Preferably, a graft polymer containing vinyl acetate in polymerized form is provided in step i). In particular, vinyl acetate is the only unsaturated monomer employed in the preparation of the graft polymer. The graft base is preferably a polyalkylene oxide wherein the alkylene oxide units are selected from ethylene oxide, propylene oxide and mixtures thereof. Preferably, the polyalkylene oxide graft base is a homo polypropylene oxide or a homo polyethylene oxide. If the graft base is a copolymer, the alkylene oxide units may be randomly distributed or present in the form of blocks. A preferred graft base is a polyethylene oxide. The number average molecular weights of suitable polyalkylene oxide graft bases are in general from about 500 to 100000, preferably about 1000 to 10000. Preferred graft copolymers that are provided in step i) and methods for their preparation are described in EP 0 224 164 A which is incorporated herein by reference.

Solvent

Preferably, the polymer composition provided in step i) is solvent-free or comprises a solvent that is not volatile under the treatment conditions of step iii). Preferably, the polymer composition provided in step i) comprises or consists of a liquid polymer. The term liquid polymer is used synonymously with the term polymer-melt.

Suitable non-volatile solvents have a boiling point of preferably at least 150° C., more preferably at least 175° C., in particular at least 200° C. under standard conditions (20° C., 1013 mbar).

Preferably, the solvent is selected from polyhydric alcohols, ether alcohols, polyether polyols, saturated acyclic and cyclic hydrocarbons, aromatic hydrocarbons, esters of alkyl and aryl carboxylic acids, hydrogenated esters of aryl carboxylic acids mineral oils, mineral oil derivatives, aprotic polar solvents, ionic liquids and mixtures thereof.

Examples of polyhydric alcohols suitable as non-volatile solvent are ethylene glycol, glycerol, 1,2-propanediol, 1,4-butanediol, etc.

Examples of suitable ether alcohols are compounds having two terminal hydroxy groups connected via an alkylene group, which can have 1, 2 or 3 non-adjacent oxygen atoms. Suitable examples are ethylene glycol monomethyl ether, ethylene glycol dimethyl ether, ethylene glycol diethyl ether, etc.

Examples of suitable polyether polyols are polyalkylene glycols. Among these are compounds having terminal hydroxy groups and having repeat units preferably selected from $(CH_2CH_2O)_{x1}$, $(CH(CH_3)CH_2O)_{x2}$, and $((CH_2)_4O)_{x3}$, where x1, x2 and x3 are, independently of one another, a whole number from 0 to 2500, preferably from 4 to 2000, with the proviso that the sum of x1, x2, and x3 is a whole number from 4 to 2500, in particular from 5 to 2000. In polyoxyalkylene compounds which have two or three repeat units of different types, the sequence is arbitrary, i.e. the repeat units involved can have random distribution, can alternate, or can take the form of blocks. Preference is given to polyethylene glycols, polypropylene glycols, polyethylene glycol-co-propylene glycols and polytetrahydrofurans.

Examples of saturated acyclic and cyclic hydrocarbons are tetradecane, hexadecane, octadecane and decahydronaphthalene.

Suitable non-volatile aromatic hydrocarbons and hydrocarbon mixtures are preferably selected from hydrocarbons having a carbon atom number in the range from 6 to 30, more preferably from 7 to 20. Preferred aromatic hydrocarbons are toluene or xylenes.

Suitable non-volatile solvents are also paraffin and paraffin oils, high-boiling mineral oil derivatives such as decalin and white oil, and also liquid polyolefins. Suitable are also technical-grade hydrocarbon mixtures having a fraction of aromatic compounds, e.g. kerosenes. Kerosenes preferably boil between 150° C. and 325° C. Suitable mineral oil fractions are e.g. known as "white spirits". They are mixtures of paraffins, cycloparaffins and aromatic hydrocarbons having boiling ranges of from 150° C. to 220° C.

Examples of suitable aprotic polar solvents are amides, such as formamide or N,N-dimethylformamide, dimethyl sulfoxide, acetonitrile, dimethyl sulfone, sulfolane, N-methylpyrrolidone, quinoline, quinaldine, etc.

Suitable ionic liquids are commercially available from BASF SE under the trade mark Basionics.

Further Additives

The polymer composition provided in step i) may contain further additives. Suitable additives are preferably selected from compounds that are not volatile under the treatment conditions of step iii).

Suitable additives are viscosity modifiers, bactericides, foam suppressants, etc.

Suitable as viscosity modifiers are alkoxylates of higher mono alcohols. Suitable higher mono alcohols are $C_8$-$C_{30}$- fatty alcohols, $C_8$-$C_{30}$-oxo alcohols, guerbet alcohols, etc. Suitable guerbet alcohol alkoxylates are commercially available, e.g. the Lutensol XL® types from BASF SE (like Lutensol XL 40, . . . , 100, 140). If those alkoxylates of higher mono alcohols are present in a grafting reaction, it is possible, that also a (usually minor amount) of the viscosity modifiers are grafted with the unsaturated monomer(s) employed in the grafting reaction. This has in general no negative influence on the function as viscosity modifier.

The polymer composition can be subjected to a post-polymerization and optionally further treatment, for example adjustment of the polymer solids content to a desired level by dilution or concentration, addition of additives, such as viscosity modifiers, bactericides, foam suppressants, etc., and other suitable treatments. Such after-treatment can be carried out in the polymerization reactor or in a separate vessel.

Post-Polymerization

In a preferred embodiment, the polymer composition provided in step i) is subjected to a post-polymerization. Post-polymerization is especially preferred if the polymer composition provided in step i) is prepared by a free-radical polymerization. On the industrial scale, it can be advantageous for the process steps following the polymerization not to be carried out in the polymerization reactor, which is extensively equipped both mechanically and in terms of process measuring and control technology, but instead in a more elementary reaction vessel, such as a so-called "blow down reactor" or formulating vessel. For this purpose, after the end of the polymerization reaction, in which the ethylenically unsaturated monomers and optionally a graft base have been reacted to an extent of ≧90% by weight, preferably of ≧95% by weight, and in particular of ≧98% by weight, the resulting polymer composition is conveyed into a downstream vessel. Preferably, the composition is conveyed into a downstream vessel without cooling.

Furthermore, also steps ii) and/or iii) can be carried out in the polymerization reactor, or (if present) the vessel employed for the post-polymerization, or in a separate vessel.

In general, post-polymerization (chemical deodorization) denotes a process for removing at least a part of the residual monomers from a polymer composition by treating said composition under polymerization conditions with an initiator. In the post-polymerization, an initiator different from, similar to or the same as the initiator of the main polymerization is employed, for example a redox-initiator system. Post-polymerization methods are known to the person skilled in the art. EP 0 967 232 A1 e.g. describes a process for removing residual volatiles from polymer dispersions by performing first a chemical deodorization to remove residual monomers and then a physical deodorization.

It might be advantageous to stop the chemical deodorization before the monomer conversion is complete. Thus, post-polymerization treatment is usually accompanied by secondary reactions. Preferably, the post-polymerization is ended as soon as the amount of residual monomers eliminated is approximately equal to the amount of secondary components introduced into the dispersion. In many cases, this equilibrium is reached when 90% of the residual monomers have been removed. At this point, e.g. a residual monomer content of about 1000 to 10000 ppm has been reached.

As the initiator it is possible in principle to employ all initiators and redox-initiator systems, comprising an oxidizing agent and a reducing agent, that are suitable for this purpose. Examples of suitable oxidizing agents are hydrogen peroxide and organic peroxides, such as benzoyl peroxide, t-butyl hydroperoxide, and the like. Examples of suitable reducing agents are hydroxymethanesulfinic acid and its salts, especially the sodium salt, ascorbic acid, sodium metabisulfite, acetone bisulfite, and the like. Preferred systems include hydrogen peroxide/ascorbic acid, t-butyl hydroperoxide/acetone bisulfite, and t-butyl hydroperoxide/sodium hydroxymethanesulfinate.

To control the formation of free radicals it is common to employ a transition metal salt as well. Examples of suitable salts are iron(II) chloride and iron(III) chloride, ammonium iron sulfate, and vanadium(II) sulfate (vanadyl sulfate).

For the post-polymerization, the initiator is generally used in an amount from 0.01 to 1% by weight, in particular from 0.05 to 0.3% by weight, based on the overall weight of the monomers initially employed. The temperature at which chemical deodorization is carried out is determined by the initiator that is used. It is generally within the range from 10° C. to 200° C., in particular from 20° C. to 100° C.

Post-polymerization generally takes place for a period of from about 1 minute to about 300 minutes, more preferably from about 10 minutes to about 120 minutes. Preferably, the initiator system is added continuously or in portions essentially throughout the period of post-polymerization. Nevertheless, it is also possible to add a single dosage at the beginning of the post-polymerization. The adding of the initiator system depends inter alia on the temperature and the dissolution kinetics.

Post-polymerization may be performed under reduced pressure, at ambient pressure or at elevated pressure.

Prior to the post-polymerization, the content of volatile organic components in the polymer composition is usually in a range of from 5000 ppm to 100000 ppm, more preferably of from 10000 ppm to 30000 ppm.

After the post-polymerization without stripping procedure, the content of volatile organic components in the polymer composition is preferably in a range of from 500 ppm to 50000 ppm, more preferably of from 1000 ppm to 10000 ppm.

After the post-polymerization, the polymer composition may be subjected to at least one purification step and/or regeneration step, for example filtration, dialysis, membrane filtration etc.

In a preferred embodiment, the polymer composition obtained after the post-polymerization is employed without further purification and regeneration in step ii).

Steps ii) and iii)

Steps ii) and iii) can be carried out in the polymerization reactor, or (if present) the vessel employed for the post-polymerization, or in a separate vessel. As mentioned before, it can be advantageous to carry out steps ii) and iii) not in the polymerization reactor but in a separate vessel.

The stripping agent employed in step ii) is preferably selected from liquid water, steam, inert gases and combinations thereof. Suitable inert gases are nitrogen, air or supercritical carbon dioxide. Preferred stripping agents are liquid water, steam, nitrogen and combinations of steam and nitrogen.

In a preferred embodiment, steps ii) and iii) are carried out subsequently. In this embodiment, a liquid is added to the treatment vessel as stripping agent. The liquid can be heated before it is added as the stripping agent. In this embodiment, preferably liquid water is used as stripping agent.

In step ii), liquid water can be added continuously, in one or more than one portion. Preferably, the liquid water is added in a single portion in step ii). This also encompasses an embodiment, wherein steps ii) and iii) are carried out subsequently n times, n being an integer of at least 2. In this case, in each repetition of step ii) the liquid water employed in the actual cycle is added in a single portion.

If steps ii) and iii) are carried out subsequently and liquid water is added as stripping agent, the water is added to the liquid polymer phase under temperature and pressure conditions, where essentially no water is evaporated. In this case, in subsequent step iii) the pressure is reduced and the water added in step ii) evaporates. This embodiment can be understood as a kind of in-situ water stripping. The amount of liquid water added to the polymer composition is preferably 0.5 to 15% by weight, more preferably 1 to 10% by weight, in particular 1.5 to 5% by weight, based on the total weight of the polymer composition. The pressure during addition of the liquid water is preferably in the range of from 750 to 1100 mbar. In a preferred embodiment, liquid water is added at ambient pressure.

In a further preferred embodiment, steps ii) and iii) are carried out simultaneously.

In this embodiment, preferably steam, an inert gas or a combination thereof is used as stripping agent. Most preferred as stripping agent are steam, nitrogen and combinations of steam and nitrogen.

In step iii), the polymer composition is subjected to a treatment under vacuum, wherein the pressure is reduced in the course of step iii).

The treatment in step iii) (physical deodorization) can be performed in a customary apparatus. Suitable for the treatment in step iii) is a stirred vessel, a pure bubble column or a stirred bubble column. According to the invention, a stirred vessel or a stirred bubble column is preferred. Suitable for the treatment in step iii) is also an apparatus as described in DE 12 48 943. Further suitable for the treatment in step iii) are counter-current columns as described e.g. in DE 196 21 027 A and DE 197 16 373 A, the full content of which is hereby incorporated into the present text by reference. Said column is equipped preferably with dual-flow sieve trays and/or cross-flow sieve trays. Preferably from 5 to 50 trays are being employed. Preferably, the counter-current column is configured such that the (specific) free section in the dual-flow sieve trays is from 2 to 25% and in the cross-flow sieve trays is from 1 to 10%, and the mean perforation diameter is from 10 to 50 mm in the dual-flow sieve trays and from 2 to 10 mm in the cross-flow sieve trays.

In the method according to the invention, the liquid phase constitutes the continuous phase whereas the gas forms the disperse phase. The gas will be dispersed in the liquid in the form of bubbles. Smaller bubbles give a greater interface, increasing the mass transfer between liquid and gaseous phase and thus the effectiveness of the stripping process.

Preferably, the treatment in step iii) will be performed in an essentially cylindrical apparatus, such as a vessel or a column, hereinafter also called treatment vessel. Essentially cylindrical in the present context is understood to mean that the height of the apparatus is at least 0.8 times its equivalent diameter or that its slenderness ratio (ratio of height to diameter) is at least 0.8. For example, the slenderness ratio of the apparatus is in the range from 1.0 to 30, preferably in the range from 1.1 to 20, and especially in the range from 1.2 to 10. This includes conventional vessels as well as columns.

The liquid generally has a level not exceeding 75%, preferably not exceeding 70% of the height of the apparatus, for example in the range from 40% to 75%, preferably in the range from 50% to 70% of the height of the apparatus under ambient pressure and without stripping agent being distributed.

A device for feeding the stripping agent is arranged inside and close to the bottom of the apparatus. The stripping agent can be fed in liquid or gaseous state. Suitable devices for feeding the stripping agent are for example perforated plates, filter panels, perforated tubes, ring dispensers, nozzles, injectors etc. Such devices are generally known to the person skilled in the art.

Preferably, the stripping agent will be in the gaseous state as soon as it enters the liquid phase, thus forming bubbles in the liquid. The bubbles then ascend in the liquid. Depending on the size and distribution of the bubbles in the liquid, a mixing device might be required to enhance the mass transfer. Suitable mixing devices are generally dynamic mixing devices such as agitators. Preferred agitators cause a radial or a radial/coaxial flow direction inducing high local shear. Suitable stirrers for this application are known to a person skilled in the art. Preferred are types of stirrers that are capable of transporting the liquid or the gas-carrying liquid in the vessel and also of effectively breaking-up the gas bubbles. The stirrer is preferably selected from simple blade stirrers, pitched blade stirrers, Rushton turbine stirrers, impellers, hybrid stirrers, gas-dispersing stirrers, etc. A special focus is on the production of dispersed gas-bubbles and transportation of the gas-laden liquid to the surface of the liquid face to release the gas after extraction of the VOC from the liquid phase. The type and the speed of the employed stirrer and thus the energy brought into the liquid/gas system determine the size and state of the bubbles. The operational characteristics of the stirring device account for the consistency, i.e. firmness or instability, of the foam.

The polymer composition is subjected to a treatment under vacuum. For liquid compositions that with or without stripping agent tend to foam when lowering the pressure, it is necessary to reserve some free space in the treatment vessel. The free space in the treatment vessel is in this context understood to mean the space in the vessel above the level of the liquid phase, i.e. the volume between the surface of the liquid and the head of the vessel, under ambient pressure and without stripping agent being distributed. Typically, the free space is at the minimum 25%, preferably at the minimum 30%, of the reactor space. In this context, "reactor space" means the reactor space usable for liquids that essentially do not foam. Depending on the foam formation tendency, it might be necessary to reserve even more free space to avoid an overfill of the treatment vessel and contamination of the vapour take-off line.

When the bubbles reach the liquid surface, foam forms on top of the liquid surface. The foam must not exceed a preset limit in height. The foam generally may not require more than 80% of the free space in the treatment vessel, preferably not more than 75% of the free space in the treatment vessel. Determination of the amount of foam and controlling of the maximum amount that must not be exceeded can be performed visually or by measurement of the height of foam in the treatment vessel. Suitable devices for foam detection and measurement are known to the person skilled in the art.

In a particularly preferred embodiment, the treatment in step iii) is performed in a stirred vessel. The stripping agent can be fed into the vessel by means of a perforated tube, a ring dispenser or any other device suitable for feeding in the stripping agent to the bottom region of the stirred vessel. It is advantageous to distribute the stripping agent as uniformly and close to the bottom of the vessel as possible. Suitable stirrers for this application are those mentioned above. Thus, the stirrer is preferably selected from simple blade stirrers, pitched blade stirrers, Rushton turbine stirrers, impellers, hybrid stirrers, gas-dispersing stirrers, etc.

To control the height of the foam and/or to enhance the breaking of the bubbles in the head of the treatment vessel, a second stirrer above the liquid surface might be expedient. This stirrer can cause an essentially downward flow direction, so that the foam is promoted back to the liquid breaking the bubbles. Suitable stirrers are for example propeller stirrers etc.

According to the invention, the pressure in the treatment vessel is reduced in the course of step iii). The pressure reduction is characterized by an initial pressure as starting point and an ultimate pressure as end point. The pressure reduction can be performed continuously or stepwise. Preferably, step iii) comprises detecting the formation of foam in the treatment vessel and controlling the progress of the pressure reduction so that the foam does not exceed a preset limit in height. This is preferably achieved by a stepwise reduction of the pressure such that the foam does not exceed a preset limit. The reduction of pressure is operated in such a way, that the foam does not require more than 75% to 80% of the free space in the vessel. The free space in the vessel is in this context understood to mean the space in the vessel above the level of the liquid phase, i.e. the volume between the surface of the liquid and the head of the vessel. The determination of the amount of foam and the maximum amount that must not be exceeded can be performed by measurement of the height of foam in the treatment vessel.

If steps ii) and iii) are carried out subsequently, the initial pressure in step iii) corresponds to the pressure in the treatment vessel after addition of the stripping agent in step ii).

Preferably, the initial pressure in step iii) is in a range of from 750 to 1100 mbar. In a preferred embodiment, the initial pressure in step iii) is ambient pressure.

Preferably, the ultimate pressure is at least 200 mbar, more preferably at least 400 mbar, in particular at least 500 mbar below the initial pressure. In general, the absolute pressure in the vessel will not be below 50 mbar. Nevertheless, for certain products high vacuum might be expedient, for example 0.5 mbar absolute or below.

Typically, the duration of the pressure reduction in step iii) is at least 20 minutes, for example in range from 10 minutes to 24 hours, preferably at least 40 minutes, for example in the range from 20 minutes to 6 hours.

In an especially preferred embodiment of the process according to the invention, step iii) is carried out n times, n being an integer of at least 2. Preferably, n is 2, 3, 4 or 5.

If steps ii) and iii) are carried out subsequently, it is a possible to bring the polymer composition into contact with a stripping agent only once, whereas step iii) can be carried out n times, n being an integer of at least 2. Preferably, n is 2, 3, 4 or 5. In this case, it is possible to add only one portion of liquid water as stripping agent and afterwards reduce and increase the pressure in the treatment vessel n times.

Subsequently to each step iii), the pressure is preferably increased to at least 80% of the initial pressure.

In an especially preferred embodiment of the method according to the invention, steps ii) and iii) are carried out n times, n being an integer of at least 2. Preferably, n is 2, 3, 4 or 5.

With each cycle, the parameters characterizing steps ii) and iii) can each have the same value or different values.

If the pressure is reduced stepwise in step iii), the first pressure reduction step is preferably larger from one cycle to the next cycle. If the pressure is reduced continuously in step iii), the gradient of the pressure reduction is preferably steeper from one cycle to the next cycle.

Preferably, the duration of the pressure reduction in step iii) is reduced from cycle to cycle. E.g., if n is 2, the duration of the pressure reduction in step iii) in the first cycle (n=1) is preferably in the range of from 30 minutes to 120 minutes and in the second cycle (n=2) is preferably in the range of from 10 minutes to 90 minutes.

In another preferred embodiment, the polymer composition is subjected to post-polymerization before and during the stripping procedure.

In step iii), the polymer composition is preferably subjected to an agitation. Suitable stirrer types comprise, for example, propeller stirrers, impeller stirrers, disk stirrers, paddle stirrers, anchor stirrers, oblique blade stirrers, cross-beam stirrers, helical ribbon impellers, screw-type stirrers, etc. Advantageously, this leads to a reduction of the resulting amount of volatile organic components in the resulting polymer composition.

The process of the invention allows very effective deodorization of various polymer compositions. The obtained polymer compositions usually have an amount of volatile organic components of $\leq 100$ ppm, especially $\leq 70$ ppm and in some cases even $\leq 50$ ppm.

In a suitable embodiment, a gaseous offtake is removed from the treatment vessel containing the used stripping agent loaded with volatile organic components. Generally, the gaseous offtake may be further treated by
a) increase of pressure,
b) cooling
c) treatment with an absorption medium,
d) combustion,
or a combination of two or all of these measures.

According to embodiment a), the pressure of the gaseous output from the treatment of the polymer composition is increased. The pressure increase is performed in a manner that results in a separation into a liquid phase and a gas phase. The obtained liquid phase is enriched in the volatile organic components and the obtained gas phase comprises essentially the stripping agent and is depleted in the volatile organic components.

According to embodiment b), the temperature of the gaseous output from the treatment of the polymer composition is reduced. The temperature reduction is performed in a manner that results in a separation into a liquid phase and a gas phase. The obtained liquid phase is enriched in the volatile organic components and the obtained gas phase comprises essentially the stripping agent and is depleted in the volatile organic components.

According to embodiment c), the gaseous output from the treatment of the polymer composition is brought into contact with an absorption medium to remove at least a part of the contained volatile organic components. For removing volatile organic components, the gaseous output is usually brought into contact with a liquid absorbent in an absorber. The volatile organic components are dissolved in the absorbent. In this way, an exit gas stream substantially freed from volatile organic components and a loaded absorption medium are obtained. The exit gas stream depleted in volatile organic components can be reused as stripping agent. The treatment of the polymer composition with an absorption medium in step c) can be performed in the fashion of a customary gas scrubbing process. Suitable scrubbing apparatuses are, for example, columns containing random packings, columns containing structured packings and tray columns, membrane contactors, radial-flow scrubbers, jet scrubbers, Venturi scrubbers and rotary spray scrubbers. Generally, the obtained loaded absorption medium can be subjected to a regeneration. Thus, the loaded absorption medium can be treated for example in a desorption column and regenerated absorption medium and released volatile organic components can be separated off. Before the regenerated absorption medium is again introduced into the absorber, it can be cooled to a suitable absorption temperature.

According to embodiment d), the gaseous output from the treatment of the polymer composition is subjected to a combustion. Combustion is connected with essentially complete oxidation of the organic compounds to $CO_2$. Depending on the nature of the volatile organic components, the combustion gas can contain minor amounts of further components, e.g. $SO_2$, $NO_x$, etc. The oxidation can be carried out with appearance of flames, that is as conventional combustion, or as oxidation without appearance of flames, for example in the form of catalytic oxidation or partial oxidation. For combustion, customarily fossil fuels such as coal, gas, diesel, etc. can be employed. Combustion of the organic substances usually proceeds in customary combustion plants by air. The exhaust gas can subjected to a scrubbing to remove carbon dioxide and further components. The removal e.g. of carbon dioxide is desirable for many reasons. In particular, it is considered the principal cause of what is termed the greenhouse effect. The removal of carbon dioxide and further acid gases is performed by know methods, e.g. scrubbing with aqueous solutions of organic bases, for example alkanolamines, as absorption media. When acid gases are dissolved, ionic products are formed from the base and the acid gas components. The absorption medium can be regenerated by heating, expansion to a lower pressure, or stripping, the ionic products back-reacting to form acid gases and/or the acid gases being stripped off by steam. After the regeneration process, the absorption medium can be reused and the treated combustion gas usually can be released into the environment without further treatment.

The gaseous output from the treatment of the polymer composition may be subjected to a combination of the aforementioned treatment measures. Thus, in order to obtain a liquid phase enriched in the volatile organic components and a gaseous comprising essentially the stripping agent, the gaseous output can be subjected to an increase of pressure a) and a reduction of temperature b).

The obtained fraction enriched in the volatile organic components can be recycled to the polymerization. In an alternative embodiment, a fraction enriched in the volatile organic components can also be subjected to a combustion as described in step d).

EXAMPLES

1. Stripping with Nitrogen

In a 6 l vessel equipped with a three-stage pitch-blade stirrer, 3.4 g/l of a polymer solution of a graft polymer of vinyl acetate on a polyethylene oxide (with a non-ionic surfactant for dilution to receive lower viscosity values) was provided. The solution further contained 4.4%, based on the polymer solution, of a guerbet alcohol alkoxylate and 15000 ppm residual vinyl acetate (VAc). The polymer solution was stirred at a constant rate while nitrogen was supplied at the bottom of the vessel via a dispenser ring containing 3 holes of 1 mm diameter each. During stirring and gassing with nitrogen, the pressure was maintained at a constant level. In table 1, the conditions of comparative examples C1, C2, C3 and of example 1 according to the present invention are listed.

TABLE 1

| Example | pressure [mbar] | nitrogen flow [l/h] | stirring rate [rpm] |
|---------|-----------------|---------------------|---------------------|
| C1 | 150 | 0 | 330 |
| C2 | 1000 | 60 | 110 |
| C3 | 1000 | 120 | 110 |
| 1 | 500 | 60 | 110 |

The nitrogen flow is given as volume flow rate at 25° C. and 1013 mbar.

FIG. 1 shows the decrease in the normalized vinyl acetate concentration over time. The normalized VAc concentration is the concentration of vinyl acetate at any time based on the concentration of vinyl acetate immediately before/at the beginning of the stripping. The VAc concentration in the examples has been determined by gas chromatography.

Comparative examples C1 to C3 show that, taken by itself, neither a considerable decrease in pressure even with intensified stirring nor the stripping with nitrogen affords a satisfactory decrease in the VOCs. The results in example 1 confirm that the combination of stirring, decreased pressure and stripping agent is the only effective way to reduce the VOC content satisfactorily.

2. Stripping with Water

In a 6 l vessel equipped with a three-stage pitch-blade stirrer, 3.4 g/l of a polymer solution of a graft polymer of vinyl acetate on a polyethylene oxide (with a non-ionic surfactant for dilution to receive lower viscosity values) was provided. The solution further contained 4.4%, based on the polymer solution, of a guerbet alcohol alkoxylate and 15000 ppm residual vinyl acetate (VAc). The polymer solution was stirred at a constant rate of 210 rpm and at a temperature of 95° C. 4% by weight water, based on the weight of the polymer solution, were added before the stripping. After the first portion of water had been added, the pressure was gradually reduced in steps from ambient pressure to below 200 mbar. The amount of vinyl acetate was reduced from 10037 ppm before the first stripping to 162 ppm at the end of the first stripping cycle.

The pressure was then released to ambient pressure and the second portion of water was added. Again, the pressure was gradually reduced in steps from ambient pressure to about 200 mbar. The amount of vinyl acetate was reduced from to 4 ppm at the end of the second stripping cycle.

The pressure was reduced in such a way, that the foam was regulated within the given range. The height of the foam was controlled visually.

Figure 2:
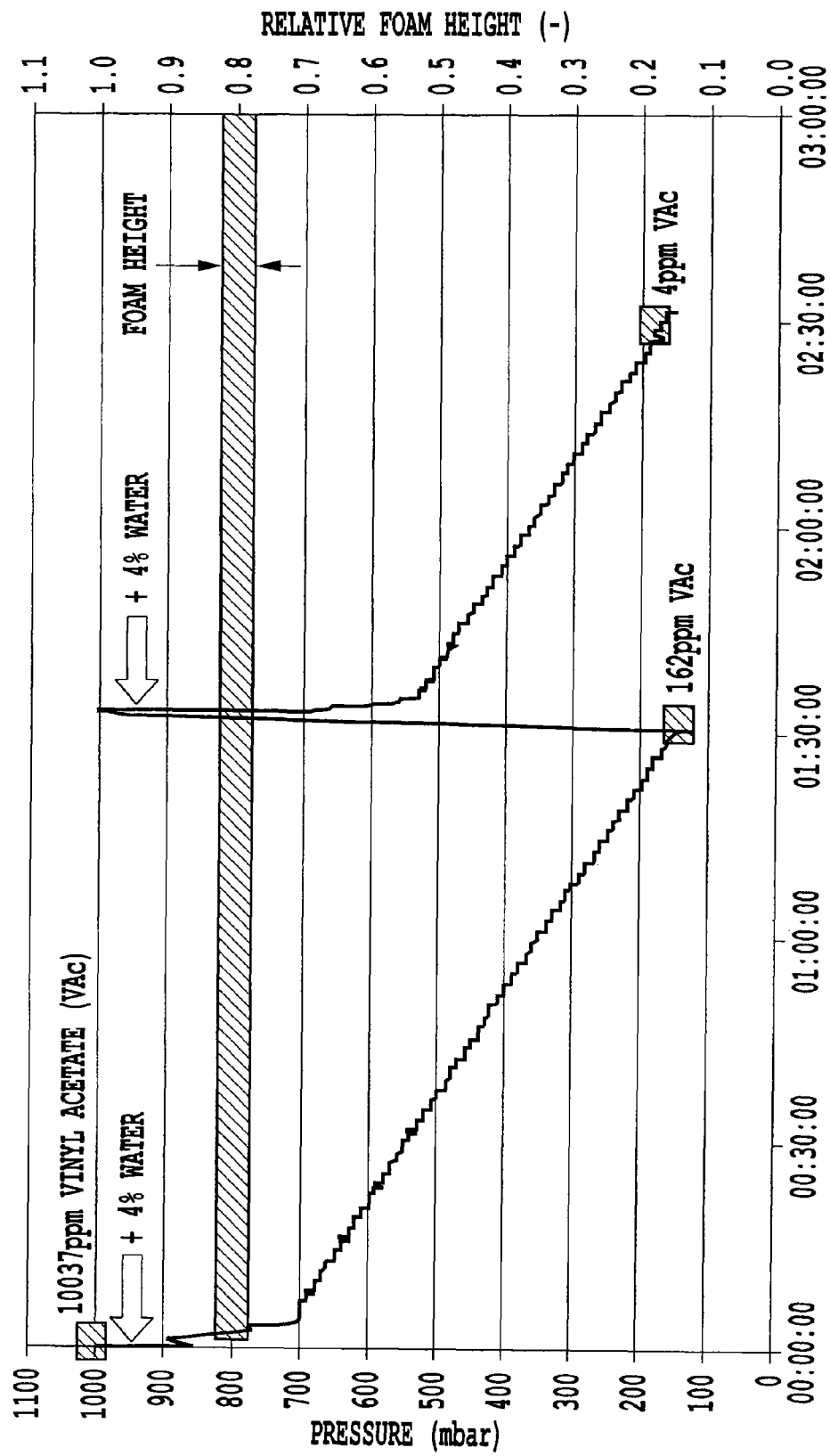
FIG. 2 shows the pressure profile and the relative foam height over time.

FIG. 2 shows the pressure profile and the relative foam height over time. The relative foam height is the medium height of the upper foam surface at any time based on the total height of the vessel/column. Again, the VAc concentration has been determined by gas chromatography.

We claim:
1. A method for the reduction of at least one volatile organic component in a polymer composition, comprising
   i) providing a liquid polymer composition which is essentially free from water and comprises a polymer and at least one volatile organic component,
   ii) bringing the polymer composition into contact with a stripping agent, and
   iii) subjecting the polymer composition to a treatment under vacuum, wherein the pressure is reduced in the course of iii).
2. The method according to claim 1, wherein the polymer composition comprises at least one surface active polymer.

3. The method according to claim 1, wherein in step iii), the ultimate pressure is at least 200 mbar below the initial pressure.

4. The method according to claim 1, wherein iii) comprises detecting the formation of foam in the treatment vessel and controlling the progress of the pressure reduction so that the foam does not exceed a preset limit in height.

5. The method according to claim 1, wherein iii) is carried out n times, n being an integer of at least 2.

6. The method according to claim 1, wherein ii) and iii) are carried out n times, n being an integer of at least 2.

7. The method according to claim 5 or 6, wherein subsequent to each iii), the pressure is increased to at least 80% of the initial pressure.

8. The method according to claim 1, wherein in iii) the polymer composition is subjected to an agitation.

9. The method according to claim 1, wherein ii) and iii) are carried out subsequently or simultaneously.

10. The method according to claim 1, wherein the polymer composition provided in i) is obtained by a free-radical polymerization.

11. The method according to claim 10, wherein the polymer composition provided in i) is obtained by a free-radical polymerization of a monomer composition comprising at least one free-radically polymerizable $\alpha,\beta$-ethylenically unsaturated monomer selected from monoethylenically unsaturated carboxylic acids, sulfonic acids and phosphonic acids, esters of $\alpha,\beta$-ethylenically unsaturated mono- and dicarboxylic acids with $C_1$-$C_{20}$-alkanols, vinylaromatics, esters of vinyl alcohol with $C_1$-$C_{30}$-monocarboxylic acids, ethylenically unsaturated nitriles, vinyl halides, vinylidene halides, esters of $\alpha,\beta$-ethylenically unsaturated mono- and dicarboxylic acids with $C_2$-$C_{30}$-alkanediols, amides of $\alpha,\beta$-ethylenically unsaturated mono- and dicarboxylic acids with $C_2$-$C_{30}$-amino alcohols which have a primary or secondary amino group, primary amides of $\alpha,\beta$-ethylenically unsaturated monocarboxylic acids and the N-alkyl and N,N-dialkyl derivatives thereof, N-vinyllactams, open-chain N-vinylamide compounds, esters of allyl alcohol with $C_1$-$C_{30}$-monocarboxylic acids, esters of $\alpha,\beta$-ethylenically unsaturated mono- and dicarboxylic acids with amino alcohols, amides of $\alpha,\beta$-ethylenically unsaturated mono- and dicarboxylic acids with diamines which have at least one primary or secondary amino group, N,N-diallylamines, N,N-diallyl-N-alkylamines, vinyl- and allyl-substituted nitrogen heterocycles, vinyl ethers, $C_2$-$C_8$-monoolefins, nonaromatic hydrocarbons having at least two conjugated double bonds, polyether (meth)acrylates, monomers having urea groups and mixtures thereof.

12. The method according to claim 10, wherein the polymer composition provided in i) is obtained by a free-radical polymerization of a monomer composition comprising an ester of vinyl alcohol with a $C_1$-$C_{30}$-monocarboxylic acid.

13. The method according to claim 10, wherein the polymer composition provided in i) is obtained by a free-radical polymerization of a monomer composition comprising at least one free-radically polymerizable $\alpha,\beta$-ethylenically unsaturated monomer in the presence of a graft base without monoethylenically unsaturated units.

14. The method according to claim 1, wherein the polymer composition provided in i) is solvent-free or comprises a solvent that is not volatile under the treatment conditions of iii).

15. The method according to claim 1, wherein the polymer composition provided in i) is subjected to a post-polymerization.

16. The method according to claim 1, wherein the stripping agent employed in ii) is selected from liquid water, steam, inert gases and combinations thereof.

17. The method according to claim 1, wherein the stripping agent containing the removed volatile component(s) is recycled into the polymerization and/or into a post-polymerization for providing the polymer composition.

18. The method according to claim 2, wherein the surface active polymer is at least one amphiphilic copolymer.

19. The method according to claim 3, wherein the ultimate pressure is at least 400 mbar below the initial pressure.

20. The method according to claim 3, wherein the ultimate pressure is at least 500 mbar below the initial pressure.

21. The method according to claim 12, wherein the ester of vinyl alcohol with a $C_1$-$C_{30}$-monocarboxylic acid is vinyl acetate.

22. The method according to claim 15, wherein the post-polymerization is under vacuum.

* * * * *